United States Patent

[11] 3,633,584

| [72] | Inventor | Roy Keith Farrell<br>Pullman, Wash. |
|---|---|---|
| [21] | Appl. No. | 831,850 |
| [22] | Filed | June 10, 1969 |
| [45] | Patented | Jan. 11, 1972 |
| [73] | Assignee | Research Corporation<br>New York, N.Y. |

[54] METHOD AND MEANS FOR MARKING ANIMALS FOR IDENTIFICATION
8 Claims, 18 Drawing Figs.

[52] U.S. Cl. .................................................... 128/316,
101/19, 101/20
[51] Int. Cl. .................................................... A61d 1/00
[50] Field of Search ......................................... 128/303.1,
303.13, 316, 329, 303.18; 126/402–404;
219/227–230; 101/19, 20, 26; 158/14–16; 119/1;
40/300; 62/293

[56] References Cited
UNITED STATES PATENTS
1,833,391  11/1931  Giorgio ........................ 101/20

2,239,761  4/1941  Stone ........................... 101/20

FOREIGN PATENTS
104,659  7/1938  Australia ...................... 126/402
156,220  4/1954  Australia ...................... 128/316

*Primary Examiner*—L. W. Trapp
*Attorney*—Stowell & Stowell

ABSTRACT: A system for forming forgery-proof identification markings on animals involves use of a tool having an impress jaw carrying a plurality of individually removable and rotatably resettable markers linearly arranged along a fixed impressible orientation line element on the jaw. The markers have faces that occupy adjoining spaces along the orientation line and the faces are provided with forming elements in the shape of double bar markings arrangeable perpendicular or parallel to the orientation line and in the shape of right-angle markings having their apices arrangeable at selected distances perpendicularly to the orientation line and their angular legs in selected geometrically patterned relation with such orientation line whereby such markings have a unique and unalterable meaning which is translatable into digits of the Arabic decimal positional system.

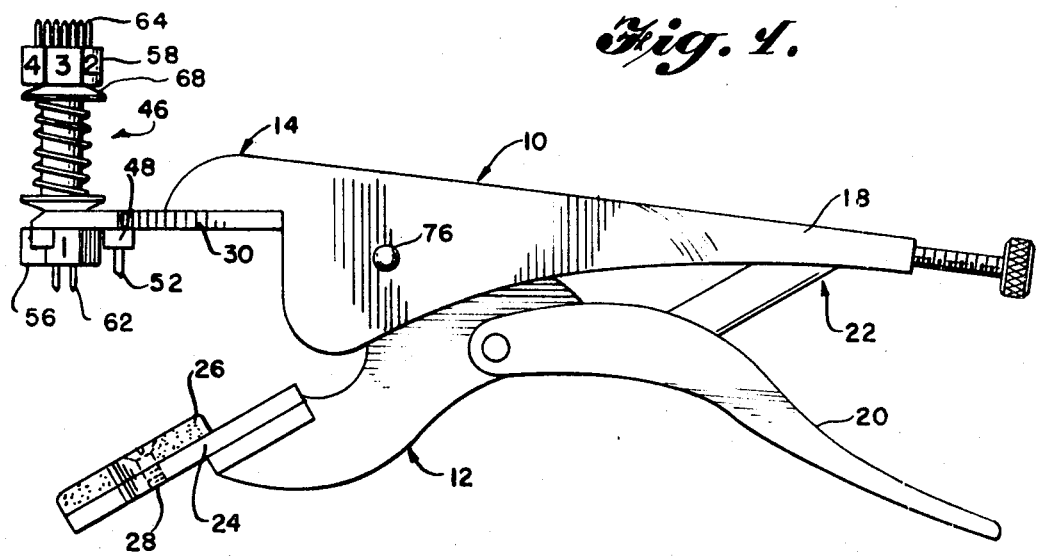
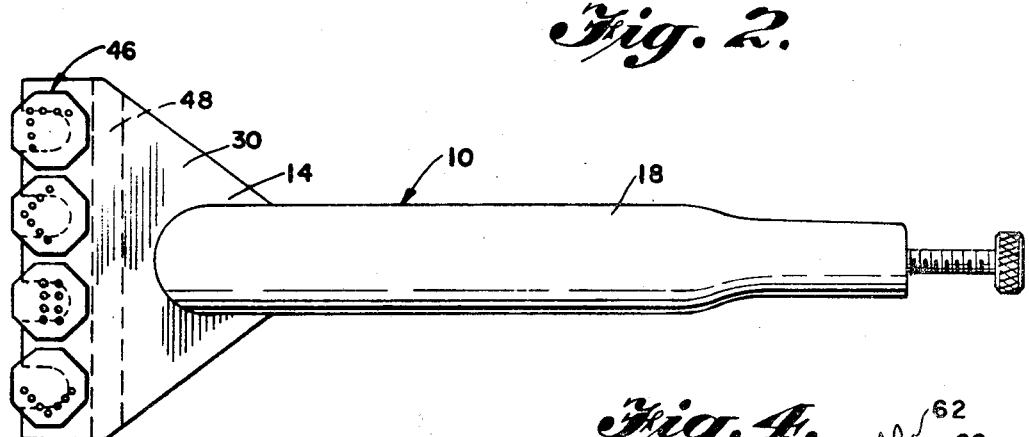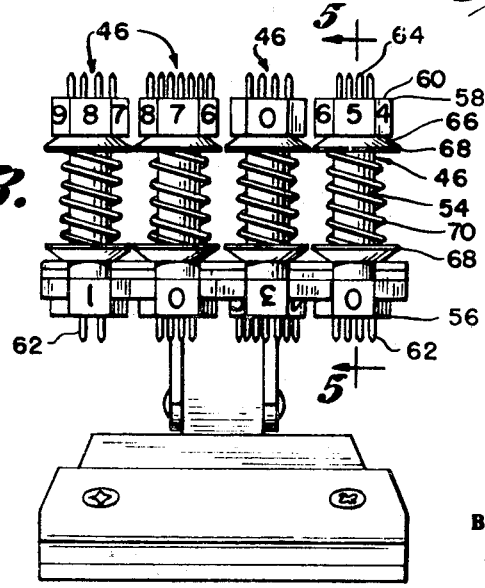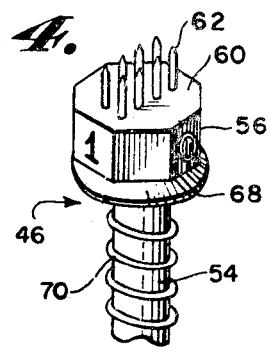

INVENTOR
R. KEITH FARRELL

BY Stowell & Stowell
ATTORNEYS

INVENTOR
R. KEITH FARRELL

BY *Stowell & Stowell*
ATTORNEYS 3,633,584

METHOD AND MEANS FOR MARKING ANIMALS FOR IDENTIFICATION

BACKGROUND OF THE INVENTION

1. Field of the Invention

This invention generally appertains to improvements in marking or printing systems and, more particularly, is directed to new and novel improvements in a method and means for making animals for identification purposes.

2. Description of Prior Art

The need of marking individual animals in a herd has long been recognized by stockmen and the necessity for a rapid, efficient and permanently positive method of identifying laboratory and pet animals has now arisen to further add to the overall need of marking animals regardless of the purpose and irrespective of the nature and species of the animals. In the latter respect, it is becoming increasingly more imperative that all animals be registered and, in keeping with such registration, that a positive, permanent and unalterable identification means and method be provided to go along with the written registration.

Many new identification techniques have come to the forefront but, in the main, they revolve around some form of ear marking or tattooing as a method of permanent identification of individual animals. Most tattooing devices incorporate a collection of metal digits which can be set into the tattooer, removed and rearranged and reset into the tattooer for each identification member. The process of loading and unloading such instruments is convenient, cumbersome and time-consuming. In addition, a substantial percentage of the identification markings or tattoos on animals is lost because of the disappearance or omission of a few significant needle holes or dots. In addition, known devices do not solve the problem of fraudulent alteration, without detection, of such identification markings.

The prior art structures mainly use the Arabic decimal positional system and, in this regard, it can be appreciated that decimal numerals can be easily altered by forgery; for instance, forgers can easily change the numbers 0, 6 and 9. Where alphabet letters are used as the markings, such can also be easily altered.

Exemplary of the prior art type of markers which are employed in known methods of animal identification is U.S. Pat. No. 1,489,558 granted Apr. 8, 1924 to Charles E. Timson. Such patent discloses a tool composed of pivoted jaws, one of which is a type carrier having a groove for receiving type blocks that have a dovetail projection fitting in the groove. The type blocks have projecting tattoo needles which are arranged on the outer faces of the type blocks in the form of alphabet letters. The desired character form of the needles could be Arabic numbers arranged in the decimal positional system.

Such patented structure possesses the operational drawbacks and produces the deficient identification markings which are characteristic of known devices and methods in this field. In this respect, the process of loading and unloading the type blocks on the type carrier jaw of the patented structure is very cumbersome and time-consuming. Further, it can be readily appreciated that a large number of individual type blocks must be maintained on hand and must be set into the tattooer jaw and then removed for rearrangement and repositioning on the jaw for each identification brand or, in the case of numbers, for each identification number. In addition, the tattoo markings of the prior art, exemplified by such patented arrangement, are not fully complete because by virtue of the disappearance or omission of a few significant needle dots, it can be appreciated that an all together different identification marking or number may be impressed on the skin of an animal. Along this same line, it can be appreciated that such brands or numbers can be easily altered so that the very grave and potential danger of fraudulent alteration is always present. Therefore, it can be stated in summary that the principal drawbacks of the prior art reside in the instruments being cumbersome and time-consuming in use and in the methods and systems not being foolproof both in original impressment of identification markings and in preventing subsequent fraudulent alteration, without detection, of such markings.

SUMMARY OF THE INVENTION

A primary object of the present invention is to overcome such drawbacks by providing a method and means for marking animals for identification which involves the utilization of a symbol system in place of Arabic numerals or alphabet letters to produce identification marks, which system utilizes symbols that are so designed and arranged that they are forgery-proof in that they cannot be altered without detection and so that they are positively permanent in that the disappearance or omission of portions of the symbols will not result in loss of the true and original meaning of the symbols.

From a structural standpoint, the present invention comprises a handtool having a pair of pivotally connected jaws and a pair of grips with an adjustable leverage arrangement for ease of movement of the jaws into clamping relation. One of the jaws supports a hard rubber backing pad while the other jaw is an impress jaw and has a lengthwise forward edge portion provided with a series of slots within which bars or rods are mounted. The bars have opposing faces carrying needles in various set patterns. Such needles are for tattoo purposes but any branding, for example by heat or cold freeze, elements or other marking elements can easily be substituted. The bars are reversable and are removable. They are also rotatable and are held in place by spring-urged retaining disks. The spring-urged retaining disks permit manual rotation of each of the bars by gripping the upper end of the bar and depressing the spring and rotating the bar either clockwise or counterclockwise.

The system of the invention is predicated upon the utilization of symbols instead of letters of the alphabet or Arabic numbers, since the alphabet letters and numbers can be easily altered and if not completely impressed do not properly represent the correct identifying brand or number value or designation. Vitally important to the system and the method of the invention is the provision of an orientation line, which is defined by the fixed row of needles carried by the impressing jaw posterior to the bars which are of two type forms.

The bars of one type have faces provided with a pair of parallel line forming elements in the form of a double row of tattoo needles while the bars of the other type have faces carrying a right-angle forming element in the nature of a plurality of needles set in the pattern or shape of a right angle.

The faces of the bars impress upon the anatomy of an animal symbols that have individual meaningful geometrical patterned relation with the orientation line along which the symbols are impressed on the animal.

The markers or bars having faces that are provided with the forming elements in the shape of double bar markers impress a pair of parallel lines in some angular relationship to the orientation line, preferably either perpendicular or parallel to the orientation line. When the parallel lines are disposed in spaced parallel arrangement with the orientation line, the produced symbol has a meaning which indicates or represents a zero value in the Arabic decimal positional system. When the parallel lines are arranged perpendicular to the orientation line, a symbol which is translatable into the Arabic number 1 is produced.

The markers or bars of the other type have impress faces that carry the right-angle-forming element, such as the right-angle patterned needles. Such markers are individually rotatably mounted in the impress jaw and the sides of the impression faces are eight in number having inscribed thereon the numbers 2 to 9. The marker or bar can be rotated in its mounted position on the jaw so as to dispose the right-angle forming element in various selected relationship to the orientation line with the apex of such right-angle element and the resultant symbol marking therefrom arrangeable at selected distances perpendicularly to the orientation line and the right-angular legs being arrangeable in selected geometrical patterned relation with such orientation line. The right-angle-forming element can be positioned in eight different and clearly individual positions with respect to the orientation line and in such positions it has a unique and unalterable read-out meaning which is translatable to correspond to digits 2 to 9 of the Arabic decimal positional system.

Accordingly, apart from the provision of an easily rearranged and reset tool for pressing desired identification markings on the skin of an animal, it is another important object of the present invention to provide a method of marking an animal with forgery-proof identification markings essentially comprising the steps of forming an orientation line on the portion of an animal's anatomy and forming along such line symbols having individual meaningful geometrical patterned relation with such line and with such symbols being translatable in accordance with the particular position they occupy with respect to such line into digits of the Arabic decimal positional system.

BRIEF DESCRIPTION OF THE DRAWINGS

FIG. 1 is a side elevational view of an animal-marking implement constructed in accordance with the present invention.

FIG. 2 is a top plan view thereof.

FIG. 3 is a front elevational view of the tool.

FIG. 4 is a fragmentary perspective view of one end of one of the markers or bars.

FIGS. 7 through 16 are schematic representations of the symbol-forming elements in the form of needle sets arranged to impress symbols having a meaning translatable into Arabic numbers 0 to 9.

FIG. 17 is a schematic showing of the combined arrangement of the needle sets.

FIG. 18 is a schematic representation of a formed identification combination.

DESCRIPTION OF THE PREFERRED EMBODIMENT

Figure 5:
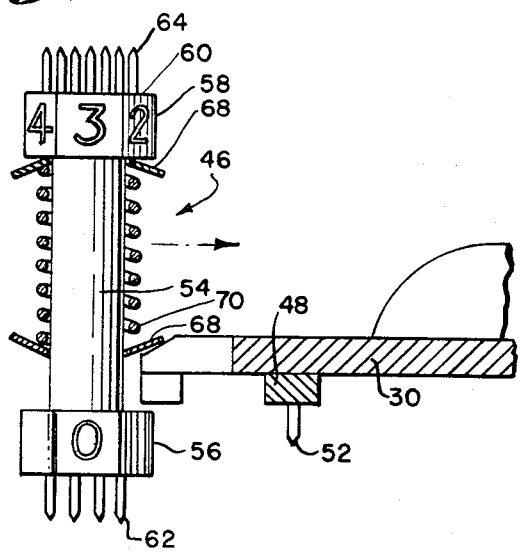
FIG. 5 is a detailed vertical cross-sectional view taken substantially on line 5—5 of FIG. 3 and showing one of the markers or bars in side elevation and removed slightly from the supporting impress jaw with the arrow indicating how the bar is inserted for locked placement on the jaw.

Referring now more particularly to the accompanying drawings, and initially to FIGS. 1 through 6, the animal-marking instrument 10 of the present invention includes a pair of complementary jaw portions 12 and 14 which are pivotally connected by a transverse pivot pin 76. Rearwardly of the pivot pin 76, the jaw portions are provided with a pair of grips 18 and 20 having an adjustable leverage system 22.

The jaw portion 12 carries a jaw 24 which supports on its working face a hard rubber backing pad 26 affixed to the face by the screw fastener 28.

The opposing jaw portion 14 supports a metal plate 30 which constitutes an impress jaw and which projects from the jaw portion in a fashion to be complemental to the jaw 24, as can be appreciated from a consideration of FIG. 1.

Figure 6:
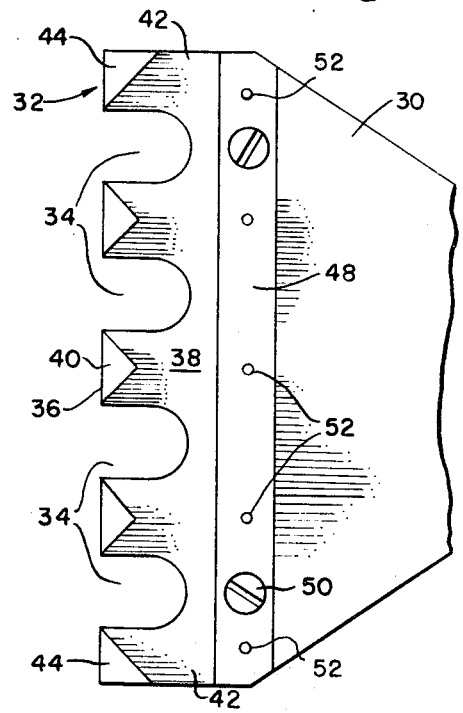
FIG. 6 is a top plan view of the front end portion of the impress jaw with the bars removed.

The impress jaw plate 30, as shown in FIG. 6, has a forward edge portion 32 which is provided with a series of spaced-apart reception slots 34 that open through the front edge 36 and which are separated by lands 38 having beveled front upper edges 40. The opposite and portions 42 of the front edge are provided with beveled upper edge portions 44. The purpose of the beveled portions on the interposed lands between the edge slots 34 is to enable the markers 46 to be easily positioned in the slots 34, as can be appreciated from FIG. 5.

A bar 48, as shown in detail in FIGS. 5 and 6, is disposed posteriorly of the slots and extends transversely thereof and transversely of the jaw so as to be parallel with the front edge thereof. The bar 48 is fixed by screw fasteners 50 to the underside of the jaw in its rearward location and carries a plurality of depending fixed needles 52 which are disposed in alignment so that they form a fixed orientation line, as will be described. Obviously, instead of the needles, other forming elements for branding, marking or impressing an orientation line can be employed.

With reference to FIGS. 3 to 5, the markers 46 are in the form of solid bars or rods 54 having opposing enlarged ends 56 and 58 which ends are octagonal-shaped and which have flat inner and outer faces. The outer faces 60 carry needles 62 in bar form and 64 in angle form that are diSposed in various and selected patterns of design, as shown schematically in FIGS. 7 through 18 and as will be described more in detail. Obviously, other marking or branding elements can be substituted for the needles, which are peculiar to tattooing.

The enlarged ends 56 and 58 have flat inner faces 66 and slidably disposed on the rods are disk-retaining plates 68 between which a coil spring 70 is fitted with a spring circumposed on each rod. The retaining disks or washers 68 are flared away from the flat inner faces 66 and cooperate with the faces in clamping the rods 46 in the slots 34, as can be appreciated from a consideration of FIGS. 1 and 5.

The spring 70 and disk-retaining plates 68 permit manual advancement of each set of digits by grasping the top end 56 or 58 of each marker bar and pushing it downwardly to depress the spring and rotating the bar either clockwise or counterclockwise until the functioning face 60 of the bar is in its proper or desired position.

As can be appreciated from a consideration of FIGS. 3 and 5, the eight sides of the enlarged ends or heads 56 and 58 are provided with numbers progressing from 2 to 9 and when the face of the end showing a particular number faces outwardly, this means that the rod is positioned so that the needle set on the face 60 will impress a symbol corresponding to such Arabic number. Consequently, by depressing the spring and rotating the rod either clockwise or counterclockwise until the desired number appears so as to be projecting forwardly of the slot at the front end of the tool, the operator is insured that a symbol corresponding in translatable value or meaning to the number showing will be formed on the animal. After the bar has been rotated and when the desired arrangement is achieved, the bar is released and the spring returns to normal tension to lock the bar in position.

The illustrated tool has four slots so that four markers are provided and each is locked in the slots in the manner shown and aforedescribed. By virtue of the provision of four markers this will permit a combination of four symbols to be formed, as shown in FIG. 18 and as will be described.

Attention is now directed to FIGS. 7 through 16 for an understanding of the series of symbols representing Arabic numerals of the decimal positional system.

It must first be appreciated, however, from a consideration of FIG. 18 that the fixed needles 52 provide an orientation line for proper readout and placement of the symbols along the line. Thus, as shown in FIG. 18, the needles 52 have impressed the orientation line 72 on the animal's skin and in read-out adjacency to such orientation line mark a selective series of symbols is impressed by virtue of the provision of the forming faces on the four markers in the four slots 34 on the front edge of the impress jaw.

The orientation line is formed on the animal's anatomy by the fixed needles 52 which form puncture points 72 in the animal's skin with the puncture points being covered with tattoo ink that is thoroughly smeared over the punctures until every one is filled. When the punctures heal, the skin closes over the tattoo ink leaving an orientation line that is defined by the puncture points since such spaced points obviously define a given line. Instead of the needles forming the punctures filled with tattoo ink, the orientation line may be branded by heat or cold on the animal's skin so that the orientation line forming element may be a branding bar or the like.

In any event, it is important that the orientation line be impressed on the animal's anatomy and that the symbols be formed along the orientation line in order that the symbols will have a proper translatable meaning and be free from alteration without detection.

Figure 7:
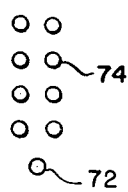

In FIG. 7, a double row of puncture holes 74 is shown in perpendicular relation to the orientation line 72 and this double row of needles forms a pair of parallel lines which will be perpendicular to the orientation line impressed on the animal's skin. Such pair of parallel lines arranged perpendicular to the orientation line 72 constitutes a symbol having a translatable meaning of the Arabic number 1.

Figure 8:
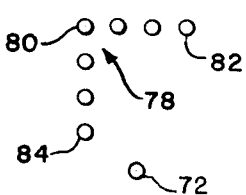

In FIG. 8, a set of puncture holes 78 is arranged in the form of a right-angle having an apex 80 and right angularly related legs 82 and 84. The leg 82 is parallel with the orientation line 72 while the leg 84 is perpendicular thereto and the apex 80 is distal to the orientation line. Such right-angle symbol has a translatable meaning corresponding to the Arabic number 2.

Figure 9:
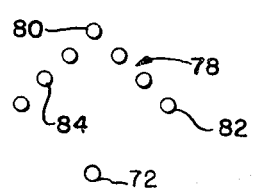

In FIG. 9, the right-angle puncture hole set 78 is shown with its apex 80 disposed distal to the orientation line 72 while the right-angular legs 82 and 84 are in divergent relation to the orientation line 72. This positioning of the right-angle is translatable into the Arabic number 3.

Figure 10:
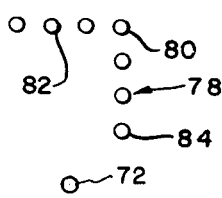

In FIG. 10, the right-angle 78 is shown with its apex 80 distal to the orientation line 72 and its leg 82 disposed parallel to the orientation line 72 while its other leg 84 is disposed perpendicular to the orientation line. The right-angle set of FIG. 10 appears to be somewhat similar to FIG. 8 in that the apexes 80 are both distal to the orientation line and the legs 84 are perpendicular thereto. However, it will be apparent that the legs 82 extend in opposite transverse directions from the leg 84 paralleling the orientation line 72. Therefore, the two right angles are easily recognizable as different and the angle of FIG. 10 has a translatable meaning corresponding to the Arabic number 4.

Figure 11:
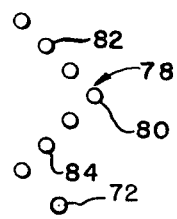

In FIG. 11, the right-angle 78 is shown with its apex 80 spaced from the orientation line 72 and the legs or sides 82 and 84 convergingly extend to the right along the orientation line so that the right-angle has a meaning corresponding to the Arabic number 5.

Figure 12:
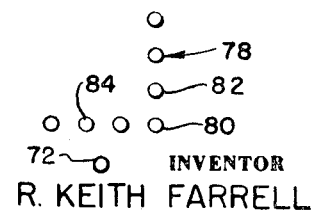
Figure 43:
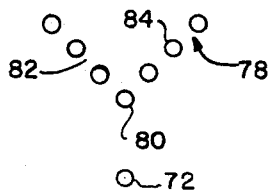
Figure 44:
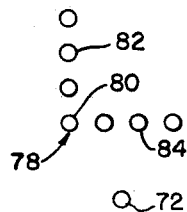
Figure 45:
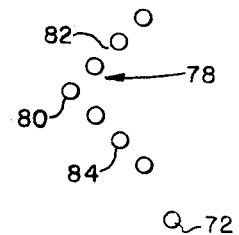
Figure 46:
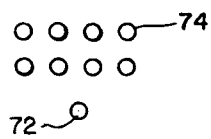
Figure 47:
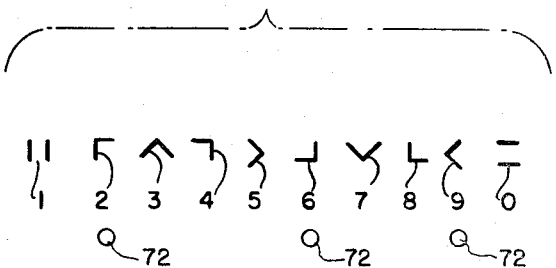
Figure 48:
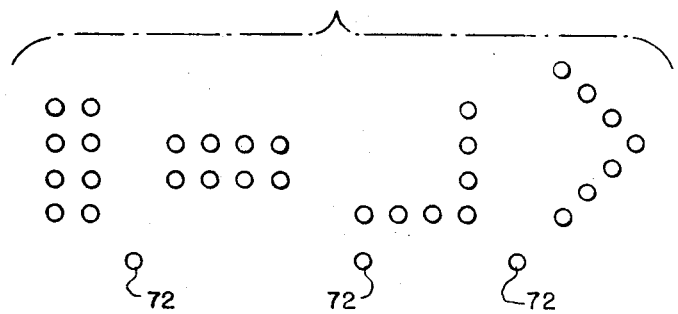

In FIG. 12, the apex 80 of the right-angle is adjacent to the orientation line 72 and the leg or side 82 is perpendicular to the orientation line while the leg or side 84 is parallel therewith and spaced adjacent to the orientation line in contradistinction to the arrangement of the right-angle as shown in FIG. 8. The right-angle of FIG. 12 has a meaning corresponding to the number 6.

In FIG. 13, the right-angle 78 has its apex 80 positioned adjacent to the orientation line 72 while the legs or side 82 and 84 coverage toward the orientation line in contradistinction to the arrangement in FIG. 9. The right-angle of FIG. 13 has a meaning corresponding to the Arabic number 7.

In FIG. 14, the right-angle 78 is shown with its apex 80 spaced adjacent to the orientation line 72 with the leg 84 disposed parallel and the leg or side 82 disposed perpendicular. The difference in appearance between the form of FIG. 14 and the form of FIG. 12 lies in the clear distinction that the parallel leg or side of the right-angle extends to the right rather than to the left as in FIG. 12. In FIG. 14, the right-angle has a meaning corresponding to the Arabic number 8.

The right-angle 78 of FIG. 15 corresponds to the Arabic number 9 and though it appears somewhat similar to the right angle of FIG. 11, it will be noted that the apex 80 is to the left so that the legs or sides 82 and 84 converge to the left rather than to the right as in FIG. 11. The right-angle of FIG. 15 has a meaning of the Arabic number 9.

In FIG. 16, the double line forming element 74 is arranged parallel to the orientation line 72 rather than perpendicular thereto as shown in FIG. 7. The parallel lines of FIG. 16 represent 0 of the Arabic decimal positional system.

It is believed that the arrangement of the symbols is best shown in FIG. 17 wherein the orientation line 72 has the symbols for the values one to zero displayed therealong so that this composite showing of FIGS. 7 through 16 clearly demonstrates how the right-angle-forming element can be rotated into different geometrical patterned relation to the orientation line 72 and that in its eight different positions it will impress a different meaning symbol on the animal. Since the single-line right angles cannot be altered without being detected and since it is not possible to alter the pair of parallel lines, representing zero and one, it can be appreciated that the marking arrangement of the present invention is forgery-proof.

This is best shown in FIG. 18 where the symbols are translated into the Arabic number 1065. The first symbol is a double-line symbol perpendicular to the orientation line 72 and can only be read as a one while the same double bar adjacent thereto lies parallel to the orientation line 72 and can only be read as zero. The following two right angles because of their position relative to the orientation line quite obviously can only be read as 6 and 5 thereby giving the full meaning "1065."

What is claimed is:

1. The method of marking an animal with forgery-proof identification markings comprising the steps of forming an orientation line on a portion of an animal's anatomy and forming along such line symbols having individual meaningful geometrical patterned relation with such line, said symbols being translatable in accordance with such relation with such line into digits of the Arabic decimal positional system.

2. The method of claim 1 wherein said symbols are of only two shapes, one symbol shape being a pair of parallel lines arranged either perpendicular to or parallel with such orientation line and the other symbol shape being a right-angle line positionable in various selected geometrical patterned relation with said orientation line.

3. The method of claim 1 wherein said symbols include a pair of parallel lines spacedly arranged parallel with the orientation line or arranged perpendicular thereto.

4. The method of claim 1 wherein said symbols include identical right angles having their apices arranged at selected distances perpendicularly from the orientation line and having their angular legs disposed in different selective geometrical patterned relation with such orientation line.

5. The method of claim 1 wherein said steps are simultaneously performed.

6. An animal marking tool comprising an impress jaw, a fixed orientation line forming element on said jaw and a plurality of markers carried by the jaw and linearly arranged thereon along the orientation line forming element, means carried by the jaw and by the markers for mounting the markers in individually removable and rotatable fashion on the jaw, and said markers have faces provided with marking elements including a pair of parallel line-forming elements and a right-angle-forming element.

7. The invention of claim 6 wherein said tool includes another jaw pivotally connected to said impress jaw and carrying a backing pad complementary to the markers carried by the impress jaw and lever means connected to said jaws for moving them into and out of clamping relation with the skin of an animal.

8. The invention of claim 6 wherein said means includes a front edge portion on said jaw having separated slots and said markers having body portions adapted to be socketed in said slots and spring-urged anchoring means carried by the body portions for removably retaining the markers in set positions in the jaw.

* * * * *